Nov. 26, 1963 D. G. WAY 3,112,062
ROTARY PUMPS AND ENGINES
Filed Aug. 19, 1960 8 Sheets-Sheet 1

Inventor:
David G. Way,
by [signature]
Attorney

Inventor:
David G. Way,
by Attorney

Fig. 6.

Nov. 26, 1963     D. G. WAY     3,112,062
ROTARY PUMPS AND ENGINES Filed Aug. 19, 1960     8 Sheets-Sheet 4

Inventor:
David G. Way,
by Attorney

Nov. 26, 1963  D. G. WAY  3,112,062
ROTARY PUMPS AND ENGINES
Filed Aug. 19, 1960  8 Sheets-Sheet 6

Inventor:
David G. Way,
by [signature]
Attorney

Nov. 26, 1963　　　D. G. WAY　　　3,112,062
ROTARY PUMPS AND ENGINES
Filed Aug. 19, 1960　　　　　　　　　8 Sheets-Sheet 8

Inventor:
David G. Way,
by Attorney

United States Patent Office 3,112,062
Patented Nov. 26, 1963

3,112,062
ROTARY PUMPS AND ENGINES
David G. Way, Boxborough, Mass.
(R.F.D., West Acton, Mass.)
Filed Aug. 19, 1960, Ser. No. 50,631
13 Claims. (Cl. 230—139)

The present invention relates to rotary devices such as engines and pumps and to combinations thereof.

While present day engines of the reciprocating piston type are efficient, they do have the objectionable feature that lubrication in the combustion chamber is essential. Such rotary engines as have been proposed were to be similarly lubricated. A principal objective of the present invention is to provide a rotary engine which does not require lubrication in the zone of its combustion chamber or chambers but has working clearances between chamber defining parts that effectively prevent leakage.

In accordance with the present invention, a rotary device consists of a housing, a rotatable member, and a rotor member connected thereto and having a plurality of rotor sections. Each rotor section includes a circular end wall and at least one arcuate part which establishes end shoulders. The rotor sections are assembled in the housing in axial alinement with the arcuate part of one confined between end shoulders of another section with the arcuate length of such parts less than the distnace between the confining end shoulders. The rotatable member is connected to the rotor member with one member being the driver and the other being driven thereby. The connection between the members is operative to control the movement of each pair of proximate shoulders toward and away from each other during the rotation of the rotor member continuously in one direction whereby the chambers defined by each pair of proximate shoulders and the included portions of the parts and the housing are alternately expanded and contracted as the rotor rotates.

It will be appreciated that the structure above described as a broad introduction to the essential features of the invention may be those of a rotary engine of gas, gasoline, and diesel types, or a positive displacement pump, the provision of which is another objective of the invention. When the rotatable member is a drive shaft and the housing has intake and discharge ports the device is a pump. In that case, rotation of the rotatable member results in the connection continuously turning the rotor in one direction with the rotor sections being alternately accelerated and decelerated relative to each other so that the chambers successively expand and contract as the proximate chamber shoulders move away from and towards each other. When the rotary device is provided with fuel delivery, firing, and exhaust systems, it is an engine and the rotatable member is continuously turned in one direction by the connection in response to the firing of fuel which causes the expansion of the chambers which are contracted by the connection to provide a compression phase.

Additional objectives are to provide combinations of rotary devices such as engines, pumps, and combinations of engines and pumps. Not only do such combinations offer the advantages that lubrication in the combustion chambers of the engines and in the chambers of the pump is avoided but also the advantages that flow from simplicity of construction and durability in use. In addition, another important objective of the invention is concerned with special combinations of the above types wherein both axial and radial balancing of forces is achieved to a noteworthy extent.

In the accompanying drawings, there are shown illustrative embodiments of the invention from which these and other of its objectives, novel features, and advantages will be readily apparent.

In the embodiment of the invention illustrated by FIGS. 1–5 and 9, showing two-cycle rotary devices, a generally indicated housing 20 is shown as including a central section 21 having cylindrical working spaces 22 and 23 separated by an intermediate web 24 and end plates 25 and 26 bolted thereto to close the working spaces. The section 21 is also provided with cavities 27 for a coolant.

The end plates 25 and 26 fixedly support axles 28 and 29 extending axially through the working spaces 22 and 23, respectively. The end plates 25 and 26 also rotatably support a shaft 30 which carries a fly wheel 31 and extends through the web 24. The web 24 is dimensioned to provide space between it and each of the end plates for an appropriate one of the shaft gears 32 and 33.

The working spaces 22 and 23 are for generally indicated rotor members 34 and 35, respectively. As the rotor members are approximately identical, they are not separately described. Each rotor member includes sections, indicated at 36 and 37 only in FIG. 9, and each section has a circular end wall 38, a hub part 39 and an arcuate part 40 projecting beyond its hub part 39 and having end shoulders 40ª and 40ᵇ. The arcuate length of the arcuate parts 40 is such that when the sections are assembled to establish the rotor members 34 and 35, mounted on an appropriate one of axles 28 and 29, each section may rotate relative to the other to a predetermined extent without an end shoulder of its arcuate part 40 engaging an end shoulder of the arcuate part 40 of the other section. Each two proximate shoulders, the shoulder 40ª of one arcuate part 40 and the shoulder 40ᵇ of the other arcuate part 40, the housing section 21, and the included portions of the sections establish a chamber. One chamber is indicated at A and the other at B and it will be apparent that as the sections are rotated relative to each other, one chamber contracts and the other expands.

Figure 1:
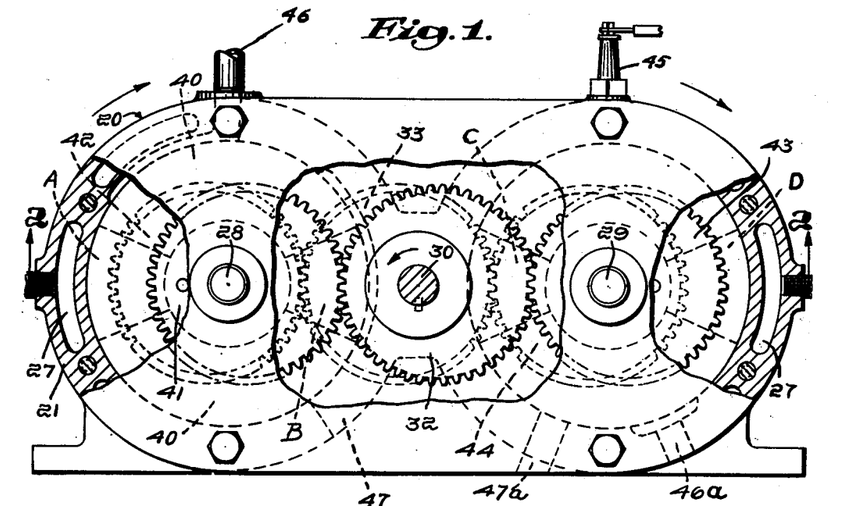
FIG. 1 is a partly sectioned end view of a unit combining two rotary devices in accordance with the invention, both devices being of the two-cycle type with one being an engine and the other a pump.
Figure 2:
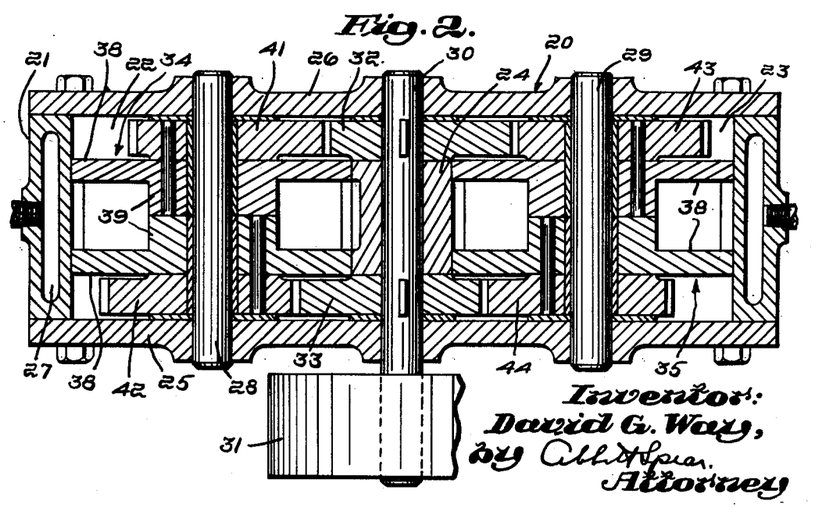
FIG. 2 is a section taken approximately along the indicated lines 2—2 of FIG. 1.

Each rotor section has a gear secured to the outer face of its end wall 38. The gears of the rotor member 34 are indicated at 41 and 42 and these and the corresponding gears 43 and 44 of the rotor member 35 mesh with the shaft gears 32 and 33, respectively. It will be noted that the shaft gears and rotor member gears are all non-circular. In FIGS. 1 and 2, the gears connecting the rotor members to the shaft 30 are shown with each two meshing gears having the maximum radiant of one meshing with the minimum radiant of the other. The two shaft gears 32 and 33 are arranged angularly 180° with respect to each other.

Figure 3:
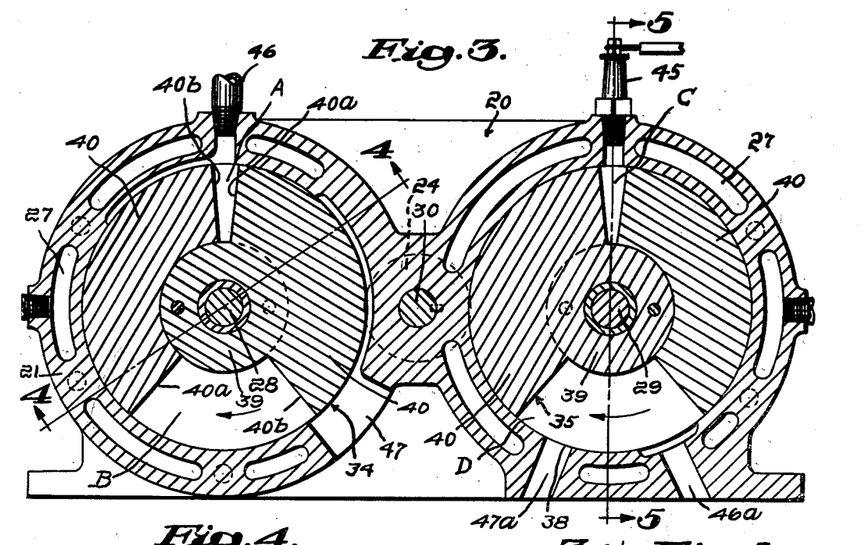
FIG. 3 is a vertical cross section showing the devices turned 90° from their positions shown in FIGS. 1 and 2.
Figure 4:
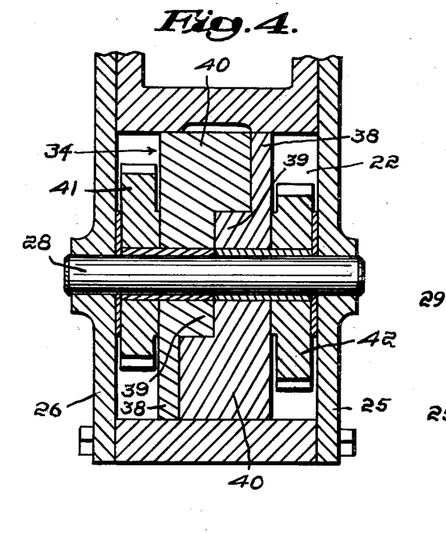
FIGS. 4 and 5 are sections taken, respectively, along the indicated lines 4—4, and 5—5, of FIG. 3.
Figure 5:
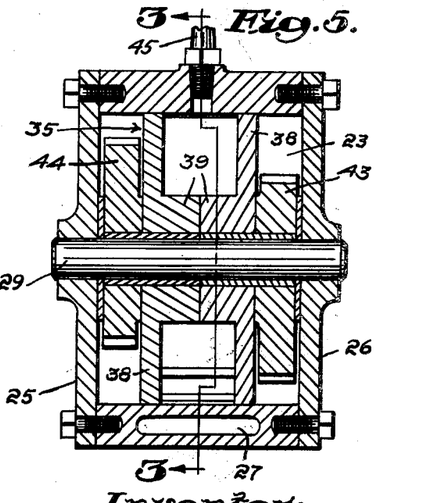

With reference to the rotary device including the rotor 34, it will be noted that as the shaft 30 is turned in one direction, the rotor member is continuously turned in the opposite direction. Assuming the instant when the gears are in their position illustrated by FIG. 1, the gear 33 rotates the gear 42 more rapidly than it is itself turning and, at the same time, the gear 32 rotates the gear 41 more slowly than it, itself, is turning. It will be noted that in FIGS. 1 and 2, the shoulders of the chambers A and B are spaced apart the same distance. Assuming rotation of the rotor member in the direction of the arrow, the different rates at which the sections are turning are attended by the shoulders of the chamber A moving towards each other while those of the chamber B are moving away from each other, cf. FIGS. 1 and 3. The rotary device including the rotor member 34 may be regarded as a positive displacement pump with the housing section 21 provided with an outlet 46 and an intake 47. In FIG. 3, the chamber A is shown as contracted to the maximum extent at the conclusion of its discharge phase and the chamber B as expanded to the maximum extent at the conclusion of its suction phase.

The rotary device including the rotor member 35 is an engine. The rotor member 35 is not described in detail since it closely approximates the rotor 34 as to its construction. Its chambers are indicated at C and D and as fuel charges are burned, first in one and then the other of them, the chambers are successively expanded and contracted. As a consequence, the rotor member 35 turns continuously in one direction to rotate the shaft 30 continuously in the opposite direction with the chambers expanding and contracting as the sections move relative to each other in the same manner as in the case of the above described positive displacement pump. The ignition, intake and exhaust systems of the engine are not completely shown as they may be conventional and are not a part of the present invention. A firing plug 45 is shown, however, to indicate the start of the expansion phase and exhaust and fuel intake ports are indicated at 46ª and 47ª, respectively. While the plug 45 may be a spark plug, it is shown as a glow plug to eliminate the necessity of timing means.

Figure 9:
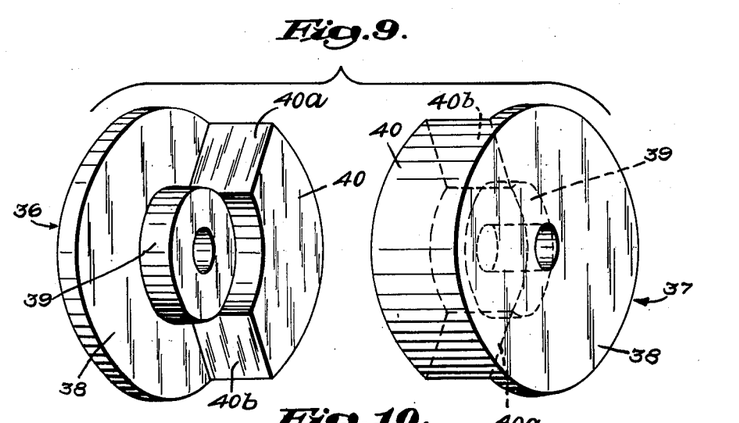
FIG. 9 is an exploded view of the rotor sections of a rotor of a two-cycle device.
Figure 9A:
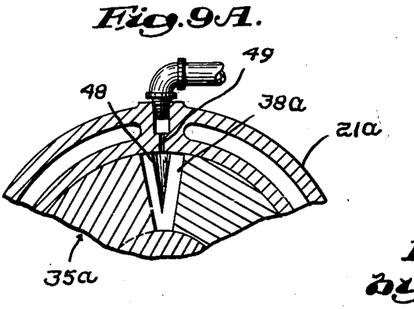
FIG. 9A is a fragmentary vertical section through the central section of the housing of an engine showing fuel injection means.
Figure 10:
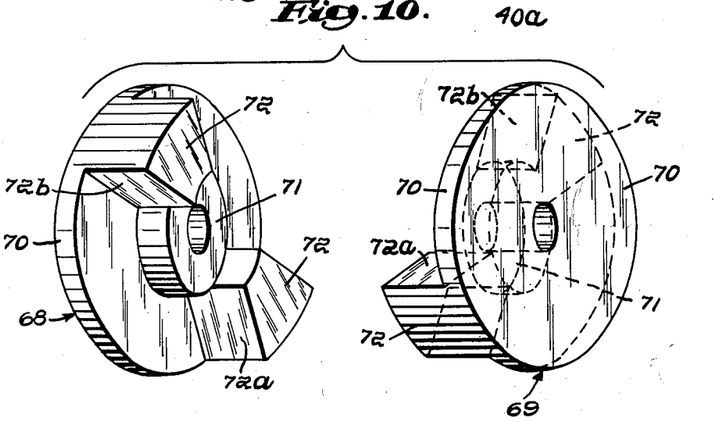
FIG. 10 is an exploded view of the rotor sections of a rotor of a four-cycle rotary device.

In FIG. 9A there is illustrated one embodiment of fuel injection means of a diesel engine. The diesel engine has a rotor member 35ª within a housing whose central section is indicated at 21ª. The rotor member 35ª is substantially identical to the rotor member 35 except that at least one end wall 38ª has passages 48 opening through the periphery and communicating with each chamber. The outlet end 49 of the fuel line is normally closed by the proximate end wall 38ª until, as shown, a passage 48 comes into registry therewith. The fuel line is for the delivery, under pressure, of diesel fuel from a suitable source.

From the rotary devices as thus far described, it will be noted that each is characterized by the absence of contact between the parts that define the combustion chambers, with leakage paths between said parts held to a minimum. The dimensions of those parts can be so controlled in production that the use of oil, either for sealing the chambers or for lubricating the parts that establish them is not necessary either in pump or engine embodiments of the invention.

In the embodiment of the invention illustrated by FIGS. 6–8 and 10, there is shown another embodiment of the invention, utilizing four-cycle rotary devices, in which a generally indicated housing 50 has a central section 51 provided with an upper, cylindrical working space 52, a lower space 53, and end plates 54 and 55 bolted thereto to close the spaces 52 and 53. The section 51 is also provided with cavities 56 for a coolant.

The end plates 54 and 55 support a shaft 57 axially of the working space 52 and a shaft 58 in the working space 53 parallel to the shaft 57 and extending through the end plate 54 and provided with a fly wheel 59.

Figure 6:
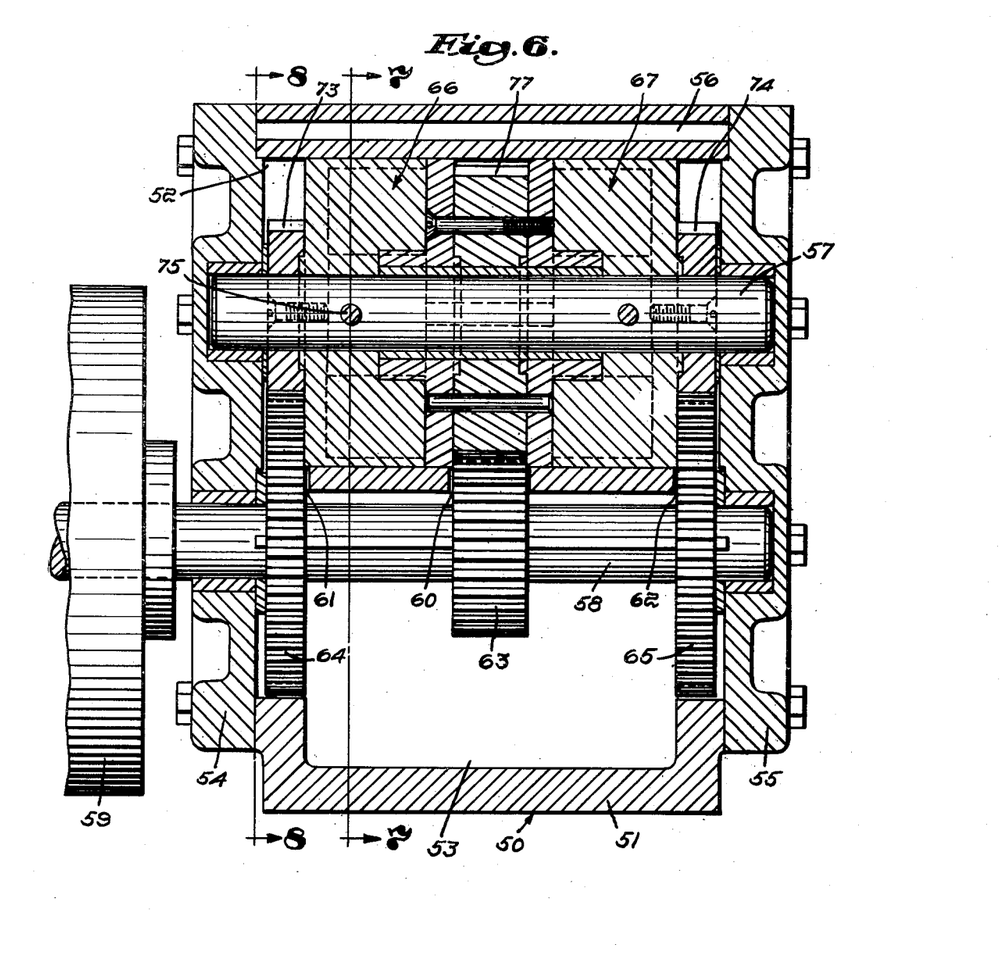
FIG. 6 is a vertical, longitudinal section of a unit in accordance with another embodiment of the invention combining two rotary devices of the four-cycle type.

The section 51 has, see FIG. 6, a central opening 60 and end openings 61 and 62 into the lower space 53 through which extend the gears 63, 64, and 65, respectively, fast on the shaft 58. These gears are non-circular and of the second order and the long axis of the gear 63 is spaced angularly 90° from the long axes of the gears 64 and 65.

Within the working space 52, there are two generally indicated rotor members 66 and 67 and, as these are identical, they are not separately described. Each of the rotor members 66 and 67 includes a pair of generally indicated sections 68 and 69, see FIG. 10, and each such section includes a circular end wall 70, a hub part 71, and diametrically opposed arcuate parts 72 projecting beyond its hub part 71. Each arcuate part 72 defines end shoulders 72ª and 72ᵇ and its arcuate length is less than the distance between the proximate end shoulders of the two arcuate parts so that when the rotor members are assembled, the sections may be turned in one direction or the other to a predetermined extent without an end shoulder of one arcuate part of one section engaging one of the end shoulders of the arcuate parts of the other section between which it is confined.

A chamber is thus established, by each proximate pair of shoulders 72ª and 72ᵇ, the housing section 51 and the included parts of the sections. There are four such chambers and these are indicated at E, F, G, and H. As one rotor section is turned relative to the other, the chambers E and G contract as the chambers F and H expand, and vice versa, twice during each complete revolution of the rotor member of which they are a part.

Secured to respective ones of the outermost end walls 70 of the sections are non-circular gears 73 and 74 of the second order. The outermost rotor sections are pinned as at 75 to the shaft 57 forming a first unit, while the intermediate rotor sections are both secured to a non-circular gear 77 forming a second unit, also of the second order and meshing with the driving shaft gear 63 but free to turn relative to the shaft 57.

Figure 7:
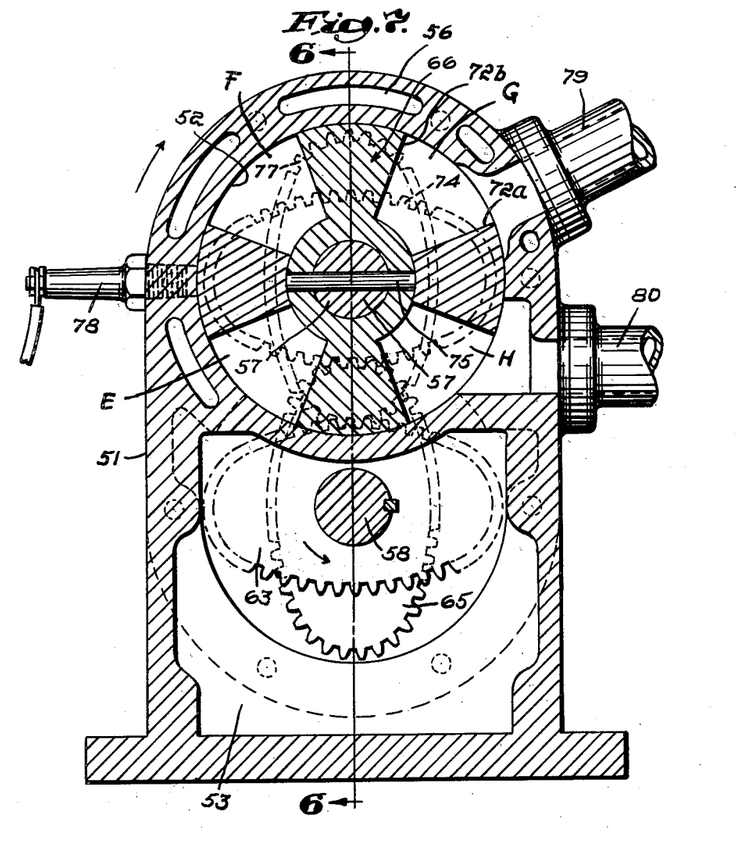
FIGS. 7 and 8 are sections taken, respectively, along the indicated lines 7—7 and 8—8 of FIG. 6.

In FIG. 7, the gears connecting the rotor members to the shaft 58 are shown with each two meshing gears having the maximum radiant of one meshing with the minimum radiant of the other. Assuming the instant when the gears are in their position illustrated by FIG. 7, the gears 64 and 65 rotate the gears 73 and 74, respectively, more rapidly than they themselves are turning and, at the same time, the gear 63 rotates the gear 77 more slowly than it, itself, is turning.

Figure 8:
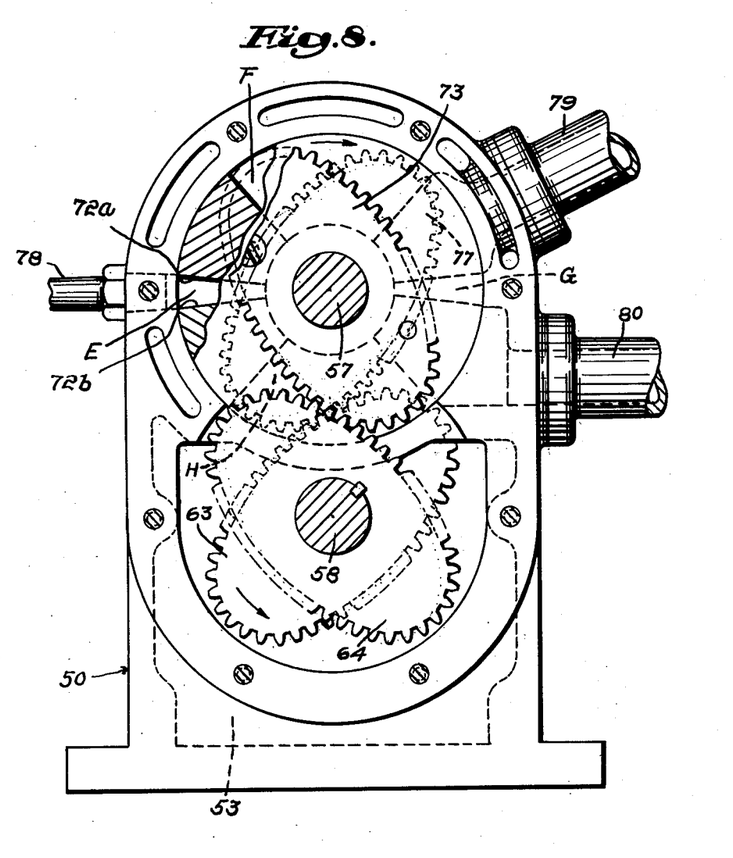

It will be noted that in FIG. 7 all of the pairs of shoulders 72ª and 72ᵇ are spaced the same distance apart. Assuming rotation of the rotor members 66 and 67 in the direction of the arrow, the different rates at which the sections are turning are attended by movement of the shoulders of the chambers E and G towards each other and movement of the shoulders of the chambers F and H away from each other until, as illustrated by FIG. 8, the chambers E and G are contracted to the maximum extent and the chambers F and H are expanded to the maximum extent and vice versa on appropriate continued rotation.

Both rotary devices may be parts of positive displacement pumps or both may be parts of engines or one such device may be an engine and the other a positive displacement pump. Although the ignition, fuel delivery, and exhaust systems are not completely shown, there is shown a firing plug 78 to indicate the zone wherein a chamber has reached its compression phase and is to be fired, as illustrated by FIG. 8, while exhaust and intake phases are illustrated by FIG. 7 with exhaust and intake ports being indicated at 79 and 80, respectively.

As in the case of the two-cycle rotary devices, the four-cycle devices have clearances between their chamber-forming parts and these may readily be so dimensioned as to avoid the use of oil either for lubricating or for sealing the chambers regardless of whether the devices are employed in pumps or engines.

It is obvious, particularly from FIG. 6, that no thrust forces are present between the rotor sections or between the rotor members and the end plates of the housing. In addition, the arrangement of FIGS. 6–8 has the important advantage, particularly when both rotary devices are parts of engines, or both are parts of pumps, that a high degree of both radial and axial balance is attained in operation. This advantage also results, of course, if rotary devices of the two-cycle type are employed.

Figure 11:
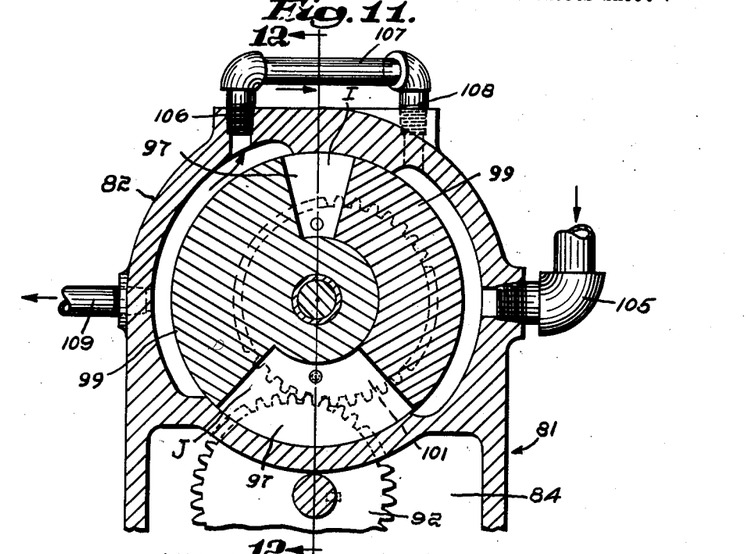
FIG. 11 is a vertical cross section of a unit in accordance with the invention combining two rotary devices arranged in tandem as a compound pump.
Figure 12:
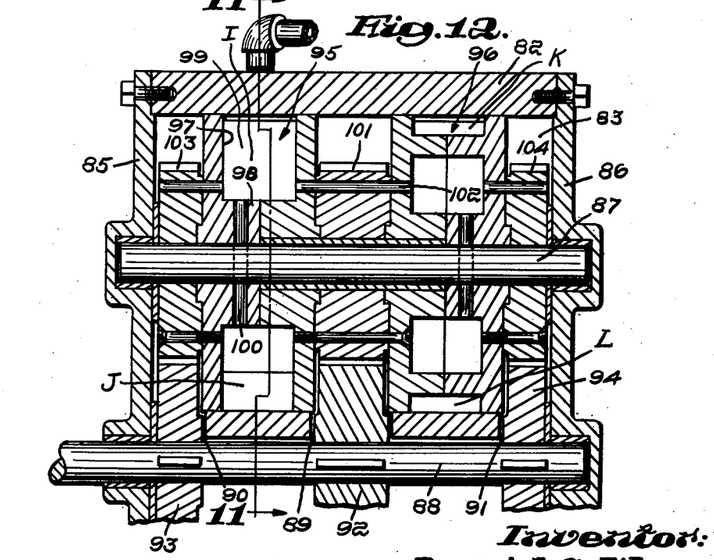
FIG. 12 is a section taken approximately along the indicated lines 12—12 of FIG. 11.

In the embodiment of the invention illustrated by FIGS. 11 and 12, a two-stage compression pump housing is generally indicated at 81. The housing 81 includes a central section 82 having a cylindrical working space 83 and a lower space 84 and end plates 85 and 86 bolted thereto to close the spaces 83 and 84. The end plates 85 and 86 support a shaft 87 axially of the working space 83 and a parallel drive shaft 88 in the working space 84. The central housing section 82 has openings 89, 90, and 91 to enclose non-circular drive shaft gears 92, 93, and 94, respectively, to enter therein.

Within the working space 83, there are two rotor members generally indicated at 95 and 96. Each rotor member comprises a pair of sections, each including circular end walls 97, a central hub part 98 and are like the sections of the embodiment illustrated by FIGS. 1–5 and 9, in that each section has but one arcuate part, identified in FIGS. 11 and 12 at 99. The rotor sections of the rotor members 95 and 96 are, however, arranged in the manner of those in the embodiment illustrated by FIGS. 6–8 in that the hub parts 98 are pinned to the shaft 87 as at 100 while the other sections are pinned together through a non-circular gear 101 as at 102.

The gear 101 meshes with the drive shaft gear 92 and the end walls of the sections are provided with non-circular gears 103 and 104 meshing with the drive shaft gears 93 and 94. The gears 92, 93, 94, 101, 103, and 104 are all of the non-circular type used in the embodiment of the invention described by FIGS. 1–5 and are arranged and function in the manner detailed in connection therewith.

As the shaft 88 is a drive shaft, both of the rotary devices, of which the rotor members 95 and 96 are the principal parts, are positive displacement pumps, within the same housing and supported by the same shaft, and their chambers are isolated from each other. The central housing section 82 has an intake 105 and a discharge port 106 for the rotary device including the rotor member 95. The discharge 106 of the pump including the rotor member 95 is connected by a conduit 107 to the intake 108 of the pump including the rotor member 96 whose discharge is indicated at 109.

The chambers of the first named rotary device are indicated at I and J while those of the other rotary device are indicated at K and L and are shown as being appropriately smaller to serve as those of the second stage of a two-stage compressor.

Figure 13:
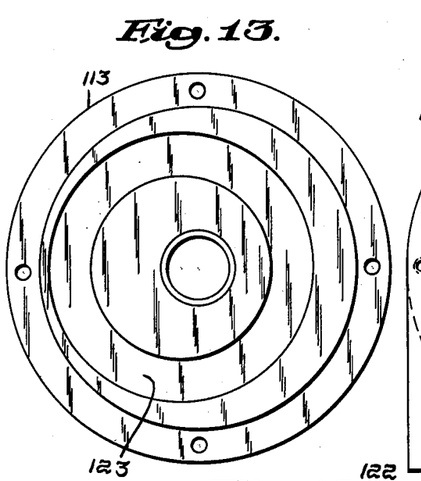
FIG. 13 is an elevation of the inner surface of one end wall of a housing of another unit in accordance with the invention.
Figure 14:
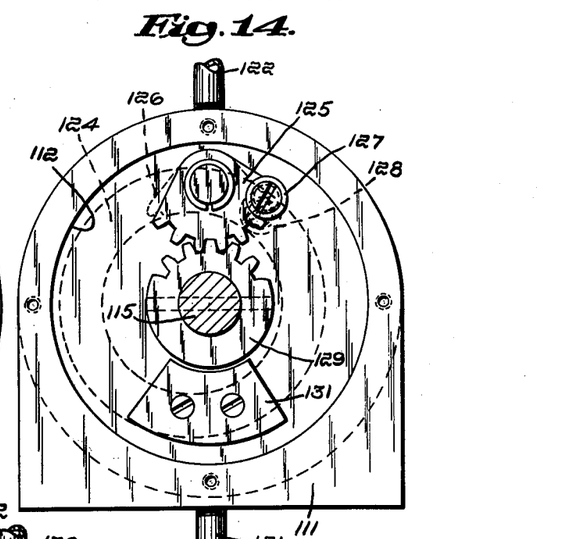
FIG. 14 is an end view of the unit as exposed by the removal of the end wall of FIG. 13.
Figure 15:
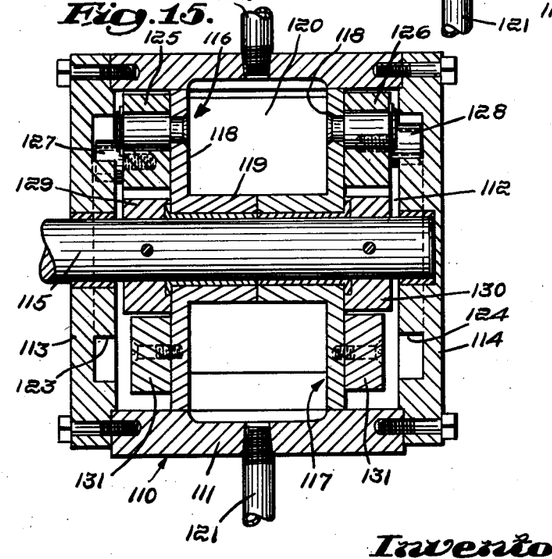
FIG. 15 is a longitudinal vertical section of the assembled unit.

The embodiment of the invention shown in FIGS. 13–15 is illustrative of another rotary device in accordance with the invention which is shown as a positive displacement pump having a generally indicated housing 110 including a central section 111 having a cylindrical working space 112 and end plates 113 and 114 bolted thereto and rotatably supporting a shaft 115 axially thereof.

Within the working space 112 there is a rotor member comprised of generally indicated rotor sections 116 and 117. Each rotor section consists of a circular end wall 118, a hub part 119, and an arcuate part 120 and these are assembled on the shaft 115 to provide a positive displacement pump similar to that shown in FIGS. 1–5 but having a different connection between the sections of its rotor member and the drive shaft 115 for accomplishing the characteristic continuous rotation of the rotor in one direction and the movement of the sections relative to each other to effect the expansion and contraction of the chambers in desired relation to the intake and discharge ports 121 and 122, respectively.

The drive shown in FIGS. 13–15 calls for a cam track 123 in the end plate 113 and a cam track 124 in the end plate 114. These are identical and are shown as eccentrically placed, true circles and are illustrative of a part for effecting the characteristic movement of the sections while the rotor member is continuously turning but are oppositely disposed. The gear segments 125 and 126 are pivotally supported by respective ones of the end walls 118 of the rotor sections. The gear segments 125 and 126 include, respectively, cam followers 127 and 128 for appropriate ones of the cam tracks. The gear segments 125 and 126 mesh with the gears 129 and 130, respectively, which are fast on the shaft 115. The end walls 118 also have weights 131 for counterbalancing their gear segments and cam followers.

In operation, the cam tracks function as the shaft 115 rotates, to effect the alternate acceleration and deceleration of first one and then the other section relative to each other to effect the alternate expansion and contraction of the chambers. It will be obvious that the embodiment of the invention illustrated by FIGS. 13–15, while described as a pump, is equally well adapted to be the basis of an engine.

From the foregoing, it will be apparent that rotary devices in accordance with the invention are adapted to a wide range of uses and provide marked advantages whether used by themselves or in combinations.

I claim:

1. In a rotary device, a housing, four rotor sections, each section including a circular end wall and at least one arcuate part and the same number of working spaces, said arcuate parts of the sections projecting axially from their walls whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two remote sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the units and between the units and the housing, the arcuate length of each working space being enough greater than that of the arcuate part fitted therein to permit the first unit to turn relatively to the second unit and to provide chambers, each defined by adjacent ends of said interfitted arcuate parts, a rotatable member, and a drive, said drive including a first connection between said rotatable member and said first unit, and a second connection between the member and said second unit, said drive including means turning said units continuously in one direction but at varying relative speeds to cause movement of said adjacent ends of said interfitted arcuate parts alternately towards and away from each other.

2. The device of claim 1 in which both pairs of interfitted sections define engines.

3. The device of claim 1 in which both pairs of interfitted sections define pumps.

4. The device of claim 1 in which one pair of interfitted sections defines an engine and the other pair of interfitted sections defines a pump.

5. In a rotary device, a housing, four rotor sections, each section including a circular end wall and at least one arcuate part and the same number of working spaces, said arcuate parts of the sections projecting axially from their walls whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two remote sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the units and between the units and the housing, the arcuate length of each working space being enough greater than that of the arcuate part fitted therein to permit the first unit to turn relatively to the second unit and to provide chambers, each defined by adjacent ends of said interfitted arcuate parts, a rotatable member, and a drive, said drive including a first connection between said rotatable member and said first unit, and a second connection between the rotatable member and said second unit, said drive including means turning said units continuously in one direction but at varying relative speeds to cause movement of said adjacent ends of said interfitted arcuate parts alternately towards and away from each other, each pair of interfitted sections defining a pump, said housing having an inlet and an outlet for each pump, the inlet of one pump being connected to the outlet of the other.

6. The device of claim 5 in which the chamber capacity of the pump receiving the discharge from the other is less than that of such other pump.

7. In a rotary device, a housing, four rotor sections, each section including a circular end wall and at least one arcuate part and the same number of working spaces, said arcuate parts of the sections projecting axially from their walls whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two remote sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the units and between the units and the housing, the arcuate length of each working space being enough greater than that of the arcuate part fitted therein to permit the first to turn relatively to the second unit and to provide chambers, each defined by adjacent ends of said interfitted arcuate parts, a rotatable member, and a drive, said drive including a first connection between said rotatable member and both sections of said first unit, and a second connection between the rotatable member and said second unit, said drive including means turning said units continuously in one direction but at varying relative speeds to cause movement of said adjacent ends of said interfitted arcuate parts alternately towards and away from each other.

8. In a rotary device, a housing, four rotor sections, each section including a circular end wall and one arcuate part and one working space, the arcuate part of each section projecting axially from the wall thereof whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two remote sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the assembled sections and between the assembled sections and the housing, the arcuate length of each working space being enough greater than that of the arcuate part fitted therein to permit the first unit to turn relatively to the second unit and to provide chambers, each defined by adjacent ends of said interfitted arcuate parts, a rotatable member, and a drive, said drive including a first connection between said rotatable member and said first unit, and a second connection between the rotatable member and said second unit, said drive including means turning said units continuously in one direction but at varying relative speeds to cause movement of said adjacent ends of said interfitted arcuate parts alternately towards and away from each other.

9. In a rotary device, a housing, four rotor sections, each section including a circular end wall and one arcuate part and one working space, the arcuate part of each section projecting axially from the wall thereof whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two remote sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the units and between the units and the housing, the arcuate length of each working space being enough greater than that of the arcuate part fitted therein to permit the first unit to turn relatively to the second unit and to provide chambers, each defined by adjacent ends of said interfitted arcuate parts, a rotatable member, and a drive, said drive including a first gear train between said rotatable member and said first unit, and a second gear train between the rotatable member and said second unit, said trains turning said units continuously in one direction but at varying relative speeds to cause movement of said adjacent ends of said interfitted arcuate parts alternately towards and away from each other, each train including a gear fixed on the associated unit to rotate therewith.

10. The device of claim 9 in which the gears of each train are non-circular and of the first order with each two meshing gears having the maximum radiant of one meshing with the minimum radiant of the other, corresponding gears of the trains being arranged angularly 180° with respect to each other.

11. In a rotary device, a housing, four rotor sections, each section including a circular end wall and two arcuate parts and two working spaces, said arcuate parts of the sections projecting axially from their walls whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two end sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each, each remote section and the intermediate section adjacent thereto being fitted together, there being working clearances between the units and between the units and the housing, the arcuate length of each working space being enough greater than that of the arcuate part fitted therein to permit the first unit to turn relatively to the second unit, and to provide chambers, each defined by adjacent ends of said interfitted arcuate parts, a rotatable member, and a drive, said drive including a first connection between said rotatable member and said first unit, and a second connection between the rotatable member and said second unit, said drive including means turning said units continuously in one direction but at varying relative speeds to cause movement of said adjacent ends of said interfitted arcuate parts alternately towards and away from each other.

12. In a rotary device, a housing, four rotor sections, each section including a circular end wall and two arcuate parts and two working spaces, said arcuate parts of the sections projecting axially from their walls whereby two sections may be fitted together with their arcuate parts disposed towards each other with the arcuate part of one within the working space of the other, the arcuate parts of interfitted sections being of the same axial length, said four sections being assembled within said housing in axial alinement to provide two intermediate sections and two end sections, means rigidly interconnecting the two remote sections to provide a first unit, means rigidly interconnecting the two intermediate sections to provide a second unit, said units being rotatable independently of each other, the arcuate parts of the intermediate sections being disposed away from each other and the arcuate parts of the remote sections being disposed towards each other, each remote section and the intermediate section adjacent thereto being fitted together, there being working clearances between the units and between the units and the housing, the arcuate length of each working space being enough greater than that of the arcuate part to permit the first unit to turn relatively to the second unit, and to provide chambers including said working spaces, each defined by adjacent ends of said interfitted arcuate parts, a rotatable member, and a drive, said drive including a first gear train between said rotatable member and said first unit, and a second gear train between the rotatable member and said second unit, said trains turning said units continuously in one direction but at varying relative speeds to cause movement of said adjacent ends of said interfitted arcuate parts alternately towards and away from each other, each train including a gear fixed on the associated unit to rotate therewith.

13. The device of claim 12 in which the gears of each train are non-circular and of the second order with the long axis of each gear of each train spaced angularly 90° with respect to the long axis of the corresponding gear of the other train.

References Cited in the file of this patent

UNITED STATES PATENTS

| | | |
|---|---|---|
| 836,430 | Angerman | Nov. 20, 1906 |
| 903,470 | Hoell | Nov. 10, 1908 |
| 971,188 | Gether | Sept. 27, 1910 |
| 1,502,756 | Thompson | July 29, 1924 |
| 1,568,053 | Bullington | Jan. 5, 1926 |
| 1,641,911 | Tschudi | Sept. 6, 1927 |
| 1,843,155 | Gronemeyer | Feb. 2, 1932 |
| 2,085,505 | Murakami | June 29, 1937 |
| 2,342,515 | Morgenstern | Feb. 22, 1944 |
| 2,544,480 | Bancroft | Mar. 6, 1951 |
| 2,544,481 | Bancroft | Mar. 6, 1951 |
| 2,553,954 | Bancroft | May 22, 1951 |
| 2,628,014 | Pemmerl | Feb. 10, 1953 |

FOREIGN PATENTS

| | | |
|---|---|---|
| 65,932 | Denmark | Nov. 24, 1947 |
| 890,992 | France | Nov. 29, 1943 |
| 944,904 | France | Nov. 15, 1948 |